Aug. 25, 1970  G. PARTES  3,525,155

GEOMETRIC INSTRUMENT HAVING IMPROVED ADJUSTMENT MEANS

Filed Jan. 28, 1969

INVENTOR.
Günther Partes

BY
ATTORNEY

United States Patent Office 3,525,155
Patented Aug. 25, 1970

3,525,155
GEOMETRIC INSTRUMENT HAVING IMPROVED ADJUSTMENT MEANS
Günther Partes, 8535 Brunn, near Emskirchen, Germany
Filed Jan. 28, 1969, Ser. No. 794,567
Claims priority, application Germany, Apr. 3, 1968, 1,761,101; Nov. 23, 1968, 1,810,631
Int. Cl. B43i *9/02*
U.S. Cl. 33—27        7 Claims

ABSTRACT OF THE DISCLOSURE

The arms of a geometric instrument are interconnected by a threaded spindle cooperating with at least one threaded sleeve. The spindle comprises a single or multiple thread having a lead angle of at least 20° to achieve nonlocking thread engagement with the sleeve. Manual forces exerted between the instrument arms produce rotation of the spindle to effect rapid adjustment of the relative arm positions.

BACKGROUND OF THE INVENTION

The present invention relates to improved geometric instruments, e.g., dividers, compasses or the like comprising a pair of arms adapted to be positionally adjusted relative to one another. Such instruments are, in themselves, well known; and various forms of adjustment mechanisms have been suggested in the past. Many of these mechanisms have taken the form of a threaded spindle or screw member adapted to be mechanically rotated and operating when so rotated to vary the relative positions of the instrument arms. Devices of this type suggested heretofore have often been so arranged that every arm adjustment, whether large or small, has required time-consuming rotation of the spindle itself, whereby rapid major adjustments of the arm positions have not been possible.

In an effort to provide for quick adjustment of the instrument arms, alternative arrangements have been suggested wherein the arms are adapted to be forcibly displaced relative to one another without causing related rotation of the spindle. One such arrangement of this type is disclosed in Heimberger U.S. Pat. No. 3,280,466 wherein a threaded spindle is associated with a deformable nut, the arrangement being such that forces applied to the instrument arms cause the threads of the nut to deform relative to the threads of the spindle so as to permit the spindle to be longitudinally displaced relative to the nut without spindle rotation. Other arrangements exhibiting somewhat similar operation have been suggested wherein, by use of split sleeves, springs, or the like, the threads of a sleeve or nut are adapted to leap over the threads of an associated threaded spindle when forces are applied between the instrument arms, so as to again permit longitudinal displacement of the spindle relative to the instrument arms without causing simultaneous rotation of the adjustment spindle.

In all arrangements of these types, wherein the threads of one threaded member are caused to be axially displaced relative to the threads of an associated member, rapid major adjustments of the instrument tend to be effected in a jerky manner. In addition, particularly when the normally engaged threads are both of metallic material, forcible major adjustments of the instrument arms tend to subject the threads to considerable wear.

The present invention is intended to obviate these disadvantages by the provision of a mechanism which permits easy, rapid, and smooth, jerk-free major adjustments of the instrument. The fin adjustment capability of the adjustment mechanism is not impaired, and any clearance between the cooperating threaded parts of the mechanism which may eventually result from wear or the like are automatically compensated for.

SUMMARY OF THE INVENTION

The present invention provides a geometric instrument comprising a pair of arms arranged for relative variable positioning, and cooperating with an adjustment mechanism comprising at least one pivotally mounted threaded sleeve carried by at least one of the instrument arms and cooperating with an elongated threaded spindle extending between said sleeve and the other instrument arm. The threaded spindle has a single or multiple thread arrangement exhibiting a lead angle of 20° or more. The spindle and its associated sleeve therefore thread engage one another in a nonlocking configuration whereby manual forces applied between the instrument arms, in directions generally parallel to the direction of elongation of the spindle, are converted into relatively rapid spinning of the threaded spindle in its associated threaded sleeve. Smooth, rapid repositioning of the instrument arms is thus possible by the mere application of forces between the instrument arms tending to push the arms together or draw them apart; and fine adjustments of the arm positions can thereafter be effected simply by further manual rotation of the spindle itself.

The nonlocking thread arrangements of the present invention may employ multiple thread configurations which, in the sense of the present invention, contemplate threads having between two and five or more grooves. If each thread has a lead angle of 20°, a triple thread constructed in accordance with the present invention would provide a lead angle of approximately 60°. Whether a single or multiple thread is employed, however, manually forced arm motions cause free rotation of the spindle about its axis, and such free rotation of the spindle minimizes wear between the cooperating threads of the adjustment mechanism during rapid opening or closing of the instrument, and also assures that the arm adjustments are absolutely jerk-free.

It has been found particularly advantageous to fabricate the threaded sleeves, which engage the threaded spindle, in one piece from a resilient elastic material, preferably plastic. Threaded sleeves made of acrylic plastic are preferred since such materials tend to eliminate almost all wear and abrasion, and achieve good sliding characteristics between the threads of the spindle and sleeve, as is necessary with the relatively large pitch selected for the spindle thread. Any wear which does occur eventually, in spite of the high wear resistance of the plastic material, tends to be compensated for by the elasticity characteristics of the plastic material selected for the threaded sleeve. Moreover, by fabricating the threaded sleeves of one-piece resiliently elastic material, the sleeves themselves become relatively easy and inexpensive to fabricate. The need for precise tolerances, such as may be necessary in metal-to-metal threaded arrangements, is avoided; and any oxidation effects or seizure of the cooperating threads, which may be possible with metal sleeves, is also avoided.

DESCRIPTION OF THE PREFERRED EMBODIMENTS

Figure 1:
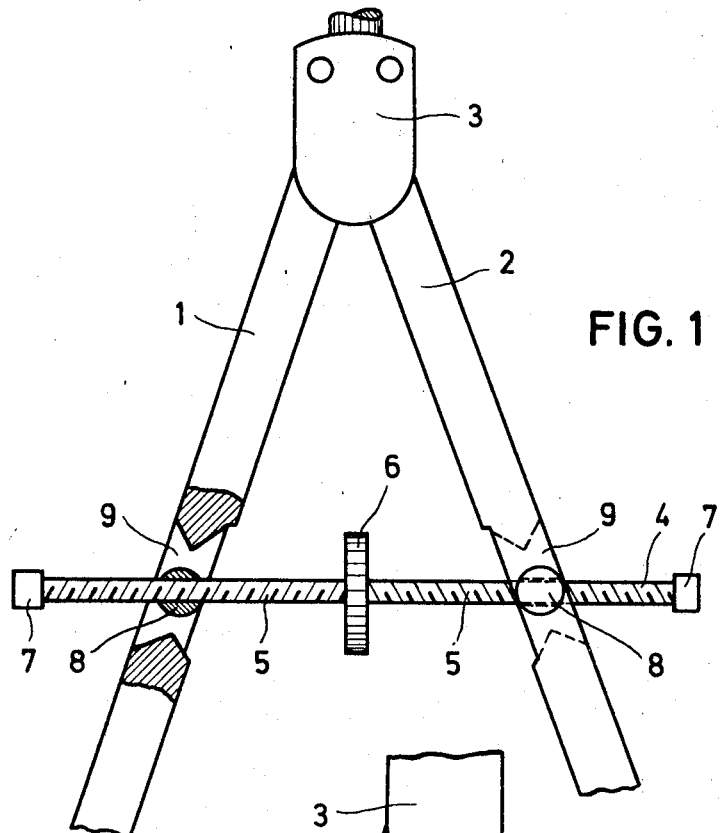
FIG. 1 is a side view in partial section of a first embodiment of the invention.

FIG. 1 illustrates one embodiment of the invention comprising a geometric instrument (e.g., a compass, dividers, or the like) comprising a pair of arms 1 and 2 which are attached at their uppermost ends by means of an appropriate gear structure or spring at or adjacent a pivot axis provided within a head structure 3. At a location spaced from the pivot axis, the arms 1 and 2 are linked together by means of a threaded spindle 4. Spindle 4 is provided with a central adjusting knob 6, and has oppositely directed threads 5 on opposite sides of knob 6 with one such thread section 5 being a right hand thread and the other threaded section 5 being a left hand thread. The opposing extremities of the threaded spindle 4 are provided with end caps 7.

A pair of threaded sleeves 8 are pivotally mounted within recesses 9 provided respectively in the two arms 1 and 2. The internal threads in each sleeve 8 are in thread engagement with an associated threaded section 5 of spindle 4; and the regions of thread engagement are equally spaced from opposite sides of adjustment knob 6 so as to provide a symmetrical arrangement. Spindle 4 and its threads are preferably metallic, whereas sleeves 8 and their threads are preferably fabricated of a plastic material. The thread angles are so chosen as to provide nonlocking engagement between the spindle and sleeves; and, more particularly, the lead angle of the threads is 20° or more in the case of a single thread, and multiples of 20° or more in the case of a multiple thread arrangement.

To achieve quick adjustments of the relative positions of arms 1 and 2, forces may be manually applied to said arms tending to move the arms toward or away from one another as may be desired. These forces, by reason of the nonlocking thread arrangement employed, are converted into relatively high speed rotary movement of spindle 4; and the said spindle 4 accordingly threads itself through both of the threaded sleeves 8 as the arms 1, 2 move smoothly and in symmetrical fashion toward or away from one another.

Figure 2:
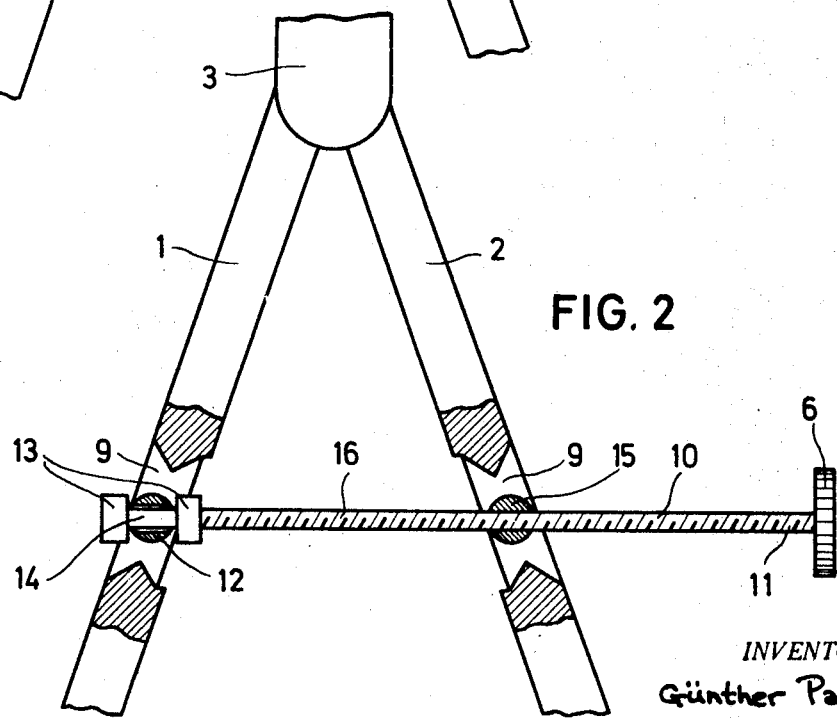
FIG. 2 is a side view, in partial section, of another embodiment of the invention.

Another embodiment of the invention is shown in FIG. 2; and, to the extent that this second embodiment employs the same parts as have already been discussed in reference to FIG. 1, like numerals have been employed. In the arrangement of FIG. 2, the threaded spindle 10 is provided with a single direction thread 16, and the adjustment knob 6 is fastened to the outer end 11 of said spindle 10. The other end 14 of spindle 10 is not threaded, and merely passes through an unthreaded bore in a threadless sleeve 12 which is pivotally supported in recess 9 of arm 1, with said end 14 of spindle 10 being retained in place by means of a pair of spaced collars 13. A pivotally supported threaded sleeve 15 is mounted in recess 9 of arm 2, and is in thread engagement with the threads of spindle 10 as illustrated. The thread engagement between sleeve 15 and spindle 10 is again of nonlocking nature, and contemplates the use of thread lead angles of the magnitudes already described.

In both embodiments of the invention, the threads may be either single threads of multiple threads. Moreover, in both embodiments of the invention, the thread angles are such that manual forces applied between the instrument arms 1 and 2 are converted into rotary motion of the adjustment spindle to provide rapid major adjustments in the arm positions. Fine adjustments may, of course, in each case then be effected simply by further manipulation of the adjustment knob 6.

Having thus described my invention, I claim:

1. In a geometric instrument of the type comprising a pair of arms mounted for movement relative to one another, a threaded adjustment spindle extending between said arms, and a threaded sleeve attached to at least one of said arms and in thread engagement with said spindle, the improvement which comprises the provision of interengaging threads on said spindle and sleeve having a lead angle of at least 20 degrees, said interengaging threads preventing locking of said spindle and sleeve upon application of manual forces directly to said arms tending to move said arm toward or away from one another and said interengaging threads providing sufficient friction to maintain the sleeve and spindle in adjusted position whereby application of such manual forces directly to said arms maintain said interengaging threads in thread engagement with one another and converts said manual forces into free, relatively high speed rotation of said spindle thereby to effect smooth, jerk-free, rapid major adjustments in the positions of said arms relative to one another.

2. The instrument of claim 1 wherein said interengaging threads comprise a multiple thread, said lead angle comprising at least a like multiple of 20°.

3. The instrument of claim 1 wherein a pair of said threaded sleeves are pivotally attached to said pair of arms respectively, said spindle extending between and being in thread engagement with both of said sleeves.

4. The instrument of claim 1 wherein one end of said spindle is attached to one of said arms, said threaded sleeve being pivotally attached to the other of said arms, said interengaging threads being provided adjacent said other of said arms only.

5. The instrument of claim 1 wherein said sleeve and its threads are fabricated of a resiliently elastic material.

6. The instrument of claim 5 wherein said resiliently elastic material comprises a plastic material.

7. The instrument of claim 6 wherein said plastic material comprises an acrylic plastic.

References Cited

UNITED STATES PATENTS

| 240,557 | 4/1881 | Soetbeer. |
| 2,966,071 | 12/1960 | Wise. |
| 3,280,466 | 10/1966 | Heimberger. |

FOREIGN PATENTS

| 890,714 | 9/1953 | Germany. |

OTHER REFERENCES

Textbook: Screw Threads—Design, Selection, and Specification, by Robert V. Mackenzie, pp. 10, 128–134.

HARRY N. HAROIAN, Primary Examiner

U.S. Cl. X.R.

33—154